United States Patent [19]

Wright

[11] Patent Number: 4,571,084
[45] Date of Patent: Feb. 18, 1986

[54] TUBE END SQUARENESS PROJECTOR APPARATUS

[75] Inventor: Dale E. Wright, Auburn, Wash.

[73] Assignee: The Boeing Company, Seattle, Wash.

[21] Appl. No.: 468,922

[22] Filed: Feb. 23, 1983

[51] Int. Cl.$^4$ .................. G01B 9/08; G01B 11/24
[52] U.S. Cl. .................................... 356/391; 356/376
[58] Field of Search .............. 356/376, 391, 138, 154; 33/174 M, 174 Q, 1 L

[56] References Cited

U.S. PATENT DOCUMENTS 2,811,074 10/1957 Davidson ........................... 356/154
4,155,648 5/1979 Ferguson ........................... 356/154

Primary Examiner—R. A. Rosenberger
Assistant Examiner—C. Cooper
Attorney, Agent, or Firm—Conrad O. Gardner; Bernard A. Donahue; Nicolaas DeVogel

[57] ABSTRACT

An optical inspection device for measuring the squareness of tube cuts. The optical inspection apparatus includes a tube guide for permitting rotation of the tube whereby its end wall thickness is positioned in the path of a light beam whose output end is magnified and projected on a viewing screen. Variations in the squareness of the tube end may be visually inspected by an operator on the viewing screen.

8 Claims, 7 Drawing Figures

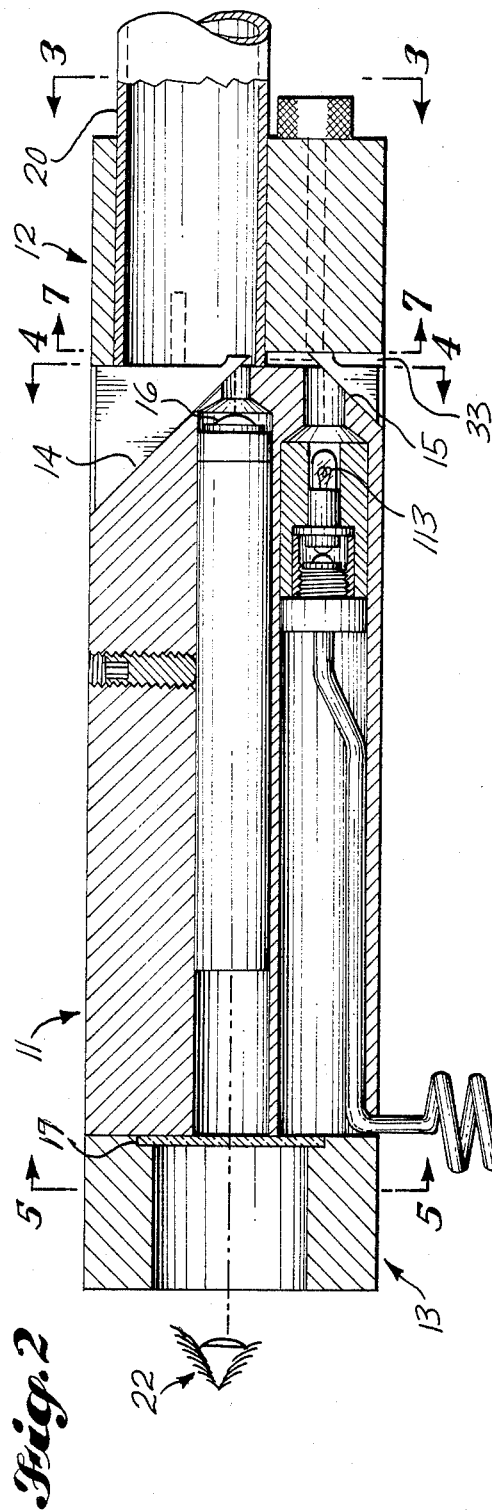
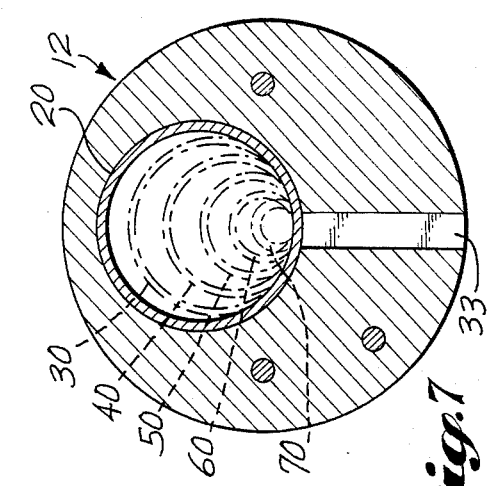
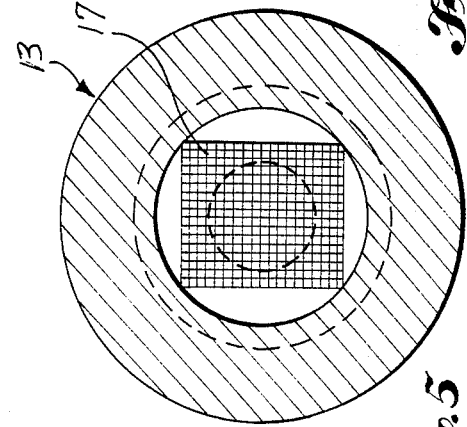
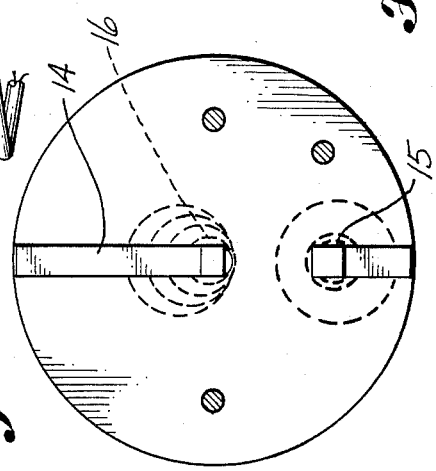
Fig.2
Fig.4
Fig.5
Fig.7

TUBE END SQUARENESS PROJECTOR APPARATUS

The present invention relates to optical inspection apparatus and, more particularly, to such an apparatus and method for measuring the squareness of tube cuts.

Heretofore, in the patent literature, as exemplified by U.S. Pat. Nos. 3,907,438, 4,297,034 and 4,298,285, systems have been provided which may be classified as rotating a workpiece contour projection systems. The prior art patent literature is further illustrative of contour projections such as shown in U.S. Pat. No. 2,592,264. Also, the prior art patent literature is illustrative of an electric end squareness gauge, as seen in U.S. Pat. No. 4,138,821. The prior art patent literature, including the above-representative patents, is illustrative of the use of a light beam, reflective mirrors and either a computer memory or a screen to project an image to be inspected, and may be contrasted to the present invention relating to a handheld inspection device with a tube guide to accept the end of the tube to be inspected which further includes a light source and image-projection screen.

Heretofore, there has been a failure in apparatus utilized for inspection of tube end squareness of providing magnified viewing of the tube end. In such inspection, heretofore, there has been the requirement that the operator move his/her head or eye around the tube end while maintaining correct viewing distance from the tube end being inspected. Heretofore, there has further been an inability to accurately measure error to 0.001 inches. Also, there has been a lack of proper columation of the illuminating light source in the inspection device.

As a consequence, it is an object of the present invention to provide inspection apparatus for determining the squareness of the tube end side of a tubular member.

It is a further object of the present invention to provide a means to measure out of squareness and, further, to provide a means for measuring out of flatness.

In accordance with a preferred embodiment of the present invention, a tube end squareness projector apparatus includes a tube guide for positioning the tube to be examined, a projector housing apparatus for supporting a light source, magnifying lens, means for supporting image-reflecting mirrors, a viewing screen including a grid, and a viewing cap for retaining the screen.

A full understanding of the present invention, and of its further objects and advantages and the several unique aspects thereof, will be had from the following description when taken in conjunction with the accompanying drawings in which:

FIG. 2 is a cross section taken along the lines 2—2 of the end view of FIG. 3 of the tube end squareness projector apparatus shown in FIG. 1;

FIG. 4 is a cross-sectional view of an end of projector housing member taken along the lines 4—4 in FIG. 2;

FIG. 5 is a cross-sectional view of the viewing cap taken along the lines 5—5 in FIG. 2, deemed helpful in showing the mounting of the viewing screen; and, FIG. 6 is an enlarged partial cross section of the optical path of the apparatus seen in cross section in FIG. 2.

FIG. 7 is a sectional view taken along the lines 7—7 of FIG. 2.

Figure 1:
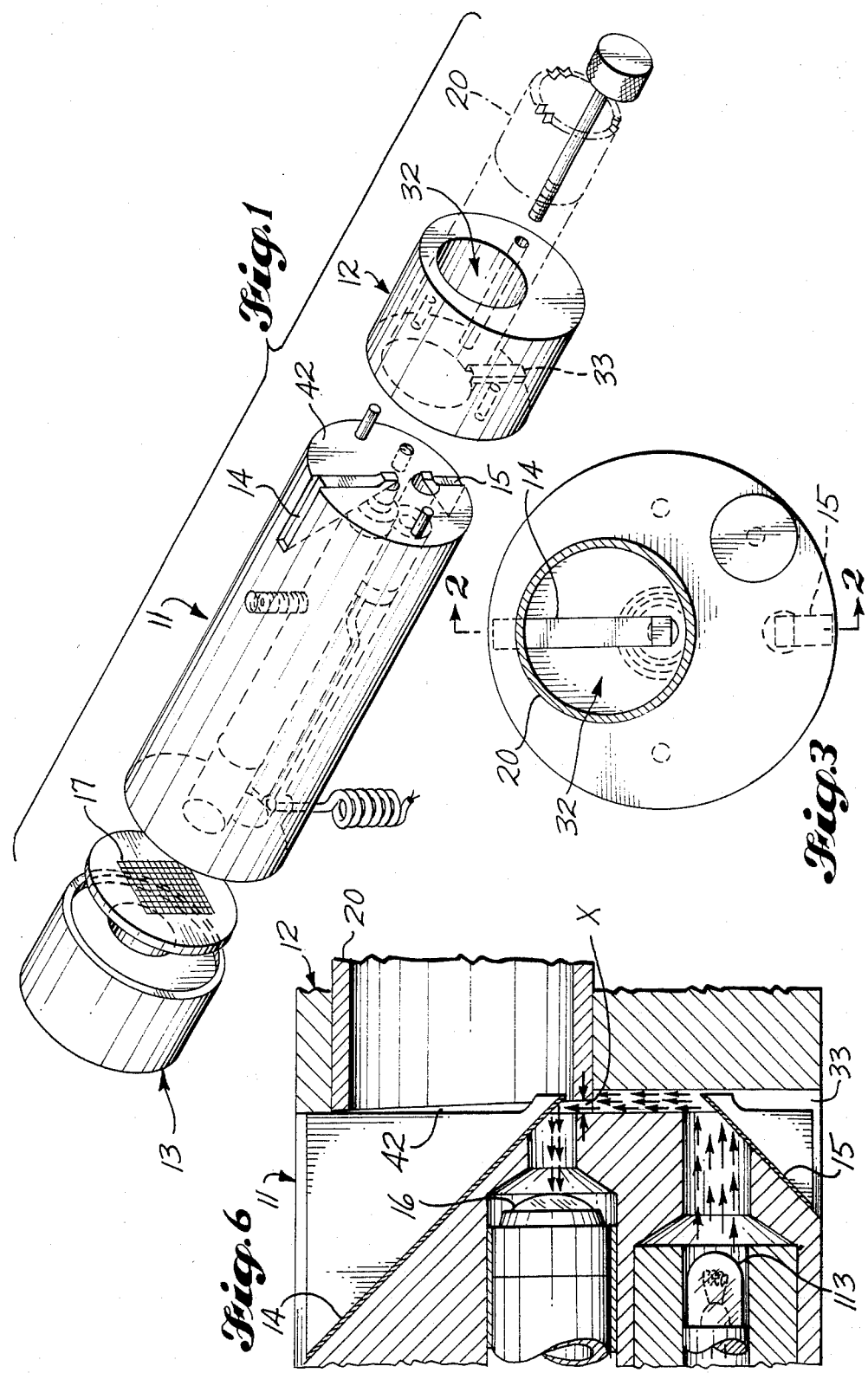
FIG. 1 is an exploded view taken in perspective showing the present tube end squareness projector apparatus.

Turning now to FIG. 1, it can be seen that the present tube end squareness projector apparatus is a three-section device assembled together through a plurality of screws. The first section 11, comprising a projector housing, supports an internally disposed light source 113 (readily seen in FIG. 2) and magnifier lens 16. Light from light source 113 (as seen in FIG. 6) is projected onto stainless steel mirror 15, supported within the first section projector housing 11, which steel mirror 15 is tilted at an angle of 45° with respect to the central axis of the housing. Light from light source 113 is then directed from stainless steel mirror 15 across the outer face of projector housing 11 and is then incident upon a further mirror surface 14 inclined at a 45° angle with respect to the central axis of housing member 11. Mirror 14, as seen in FIG. 6, then directs the light through magnifier lens 16, also supported within housing member 11, the magnifier lens 16 focusing the image on viewing screen 17.

When the tube member 20 to be checked is inserted into hole 32 (as seen in the exploded view of FIG. 1 and end view of FIG. 3) in the second section comprising tube guide member 12, its side is held perpendicular to the end face 42 of projector housing member 10. Thus, as tube member 20 is rotated, any tube end irregularities (as shown by the dimension X in FIG. 6), or angle from the square will cause light to pass between the two mirrors 14 and 15, as seen in FIG. 6. With lens member 16 focused on the tube edge, the light passing between the tube end and the projector housing member face will project as a band onto viewing screen 17, coaxially disposed across an end surface of third housing section 13, comprising a viewing cap member. The eye of the operator 22, inspecting viewing screen member 17, as seen in FIG. 5, will note that every 0.010 inch of projected light on viewing screen member 7 is representative of 0.001 inches of error from square or flat of the tube end.

The inspection of various size tube ends for squareness will require changing diameters of hole 32 in tube guide member 12 to hold the desired tube size. FIG. 7 is helpful in showing difference tube 20 sizes, e.g. 30, 40, 50, 60, 70 (decreasing in size) as viewed by an operator. In the event that greater visibility or accuracy is desired, a magnifier eye piece may be installed in an end of viewing cap member 13 opposite the end supporting viewing screen 17.

An advantageous mode of operation is provided in the present tube end squareness projector apparatus in that operator eye 22 positioning is not required to move around tube member 20 while checking a full 360° of the tube wall. A further advantage of the present optical inspection apparatus is that the present projector apparatus, without the optional magnifier eye piece, permits an operator to view viewing screen member 7 from the most comfortable distance away from viewing cap member 13. The cylindrically shaped three-piece housing of the present tube end squareness projector apparatus is rotated for tube end squareness inspection instead of requiring rotation of tube member 20, measurement as hereinbefore mentioned being independent of operator eye position.

What is claimed is:

1. An optical inspection device for measuring the squareness of tube cuts comprising:
   means for generating a light beam;
   a tube guide member arranged to be rotated while viewing the end of a tube and positioning said tube wall in the path of said light beam wherein the light output is magnified and projected upon a viewing screen to measure the squareness of a tube cut and, wherein the mismatch of said end of a tube with a projector housing end surface will cause said light beam to pass from a first mirror to a further mirror.

2. An optical inspection device for measuring tube end squareness and flatness comprising:
   tube guide members for positioning a tube end in a fixed position during tool rotation;
   a projector housing for supporting a light source, magnifying lens, and light reflecting mirrors;
   a viewing cap member for supporting a viewing screen having a measuring grid; and,
   said tube end disposed so that the light beam from said light source is reflected between said reflecting mirrors with said tube end projecting into the light beam path thereby providing a light band for any lack of tube end squareness or flatness, for projection on said viewing screen.

3. The invention according to claim 1 wherein every 0.010 inch of projected light upon said viewing screen is representative on said measuring grid of 0.001 inch of error from square or flatness of said tube end.

4. The invention according to claim 2 wherein said magnifying lens has a magnifying power of 10 times.

5. A round three section tube end squareness projector apparatus comprising, in combination:
   a projector housing member having the ends thereof ground perpendicular to the side thereof and two shafts bored perpendicular to the ends thereof;
   a point light source mounted in one of said two shafts so as to reflect light off a first mirror mounted at 45° to one end surface across and parallel to that surface;
   a second mirror mounted at 45° to the same surface as the first mirror so as to reflect its received light down the second shaft through a magnifying lens focused on the tube measuring point.

6. In combination in a three section tube end squareness projecting apparatus:
   a tube guide member having end surfaces ground perpendicular to the side thereof and a shaft bored perpendicular to the ends thereof, one end surface having a groove milled to allow clearance for two mirrors and light reflected between them.

7. The invention according to claim 6 wherein said tube guide member is adjusted for each tube size.

8. The invention according to claim 6 wherein a viewing cap member having ends ground perpendicular to the side thereof and a shaft bored perpendicular to the ends thereof and concentric to the magnifying lens shaft; said viewing cap member further including a viewing screen with a grid mounted on said viewing cap member.

* * * * *